(12) United States Patent
Schuster et al.

(10) Patent No.: US 10,991,107 B2
(45) Date of Patent: Apr. 27, 2021

(54) METHOD FOR ALIGNING AT LEAST ONE PART OF ONE DIGITAL IMAGE TO AT LEAST ONE PART OF ANOTHER DIGITAL IMAGE

(71) Applicant: QIAGEN GMBH, Hilden (DE)

(72) Inventors: Guido Schuster, Stäfa (CH); Thorsten Zerfass, Mülheim an der Ruhr (DE); Thomas Unterer, Lachen (CH); Jan Hauth, Kaiserslautern (DE); Maiko Lohel, Hilden (DE)

(73) Assignee: QIAGEN GmbH, Hilden (DE)

( * ) Notice: Subject to any disclaimer, the term of this patent is extended or adjusted under 35 U.S.C. 154(b) by 303 days.

(21) Appl. No.: 16/060,875

(22) PCT Filed: Dec. 9, 2016

(86) PCT No.: PCT/EP2016/080509
§ 371 (c)(1),
(2) Date: Jun. 8, 2018

(87) PCT Pub. No.: WO2017/098011
PCT Pub. Date: Jun. 15, 2017

(65) Prior Publication Data
US 2020/0273183 A1 Aug. 27, 2020

(30) Foreign Application Priority Data
Dec. 10, 2015 (EP) .................................... 15199409

(51) Int. Cl.
*G06T 7/32* (2017.01)
*G06T 3/20* (2006.01)

(52) U.S. Cl.
CPC .................. *G06T 7/32* (2017.01); *G06T 3/20* (2013.01); *G06T 2207/10064* (2013.01); *G06T 2207/20021* (2013.01); *G06T 2207/30004* (2013.01)

(58) Field of Classification Search
None
See application file for complete search history.

(56) References Cited

U.S. PATENT DOCUMENTS

| 6,738,532 | B1 * | 5/2004 | Oldroyd | G06K 9/6203 345/634 |
| 2004/0013299 | A1 * | 1/2004 | Crosby | G06T 7/337 382/168 |
| 2010/0323350 | A1 | 12/2010 | Gordon et al. | |
| 2011/0007981 | A1 * | 1/2011 | Osher | G06T 5/002 382/255 |

(Continued)

FOREIGN PATENT DOCUMENTS

| WO | WO 2008/097455 A1 | 8/2008 |
| WO | WO 2009/117119 A1 | 9/2009 |
| WO | WO 2014/020137 A1 | 2/2014 |

OTHER PUBLICATIONS

A Survey of Image Registration Techniques. Brown (Year: 1992).*

(Continued)

*Primary Examiner* — Delomia L Gilliard
(74) *Attorney, Agent, or Firm* — Sterne, Kessler, Goldstein & Fox P.L.L.C.

(57) ABSTRACT

The present invention relates to a method and a system for aligning at least one part of a second digital image with at least one part of a first digital image comprising: dividing the at least one part of the first digital image into a plurality of tiles t_fi; dividing the at least one part of the second digital image into a plurality of tiles t_si; creating a plurality of correlation images fci; determining the position of a global maximum correlation value p_v' for each of the plurality of correlation images fci_v'; calculating a plurality of first offset vectors fov, the offset vector fov_v" representing the (Continued)

offset between the tile t_siv" and the corresponding tile t_fiv"; and aligning the at least one part of the second digital image with the at least one part of the first digital image by applying the corresponding first offset vectors fov.

20 Claims, 4 Drawing Sheets

(56) References Cited

U.S. PATENT DOCUMENTS

| | | | | |
|---|---|---|---|---|
| 2013/0203627 | A1* | 8/2013 | Moll | G01N 21/6452 |
| | | | | 506/9 |
| 2018/0204111 | A1* | 7/2018 | Zadeh | G06K 9/00281 |
| 2020/0009525 | A1* | 1/2020 | Vieceli | G01N 21/6456 |

OTHER PUBLICATIONS

Image Registration: A Survey. Zitova et al. (Year: 2003).*
International Search Report and Written Opinion of the International Searching Authority directed to related International Patent Application No. PCT/EP2016/080509, dated Apr. 24, 2017; 15 pages.
International Preliminary Report on Patentability directed to related International Patent Application No. PCT/EP2016/080509, dated Jun. 12, 2018; 12 pages.
Brown, "A Survey of image Registration Techniques," ACM Computing Computing Surveys, Dec. 1992, vol. 24, No. 4, pp. 325-376.
Flusser, "An adaptive method for image registration," Pattern Recognition, Elsevier, Jan. 1, 1992, vol. 24, No. 1, pp. 45-54.
Metzker, "Sequencing technologies—the next generation," Nature Reviews Genetics, Jan. 2010, vol. 11, pp. 31-46.
Simper, "Correcting general band-to-band misregistrations," Proceedings of the International Conference of Image Processing, Sep. 16, 1996, vol. 1, pp. 597-600.
Voelkerding et al., "Next-Generation Sequencing: From Basic Research to Diagnostics," Clinical Chemistry, Mar. 2009, vol. 55, No. 4, pp. 641-658.
Zitova et al., "Image registration methods; a survey," Image and Vision Computing, Elsevier, Oct. 1, 2003, vol. 21, No. 11, pp. 977-1000.

* cited by examiner

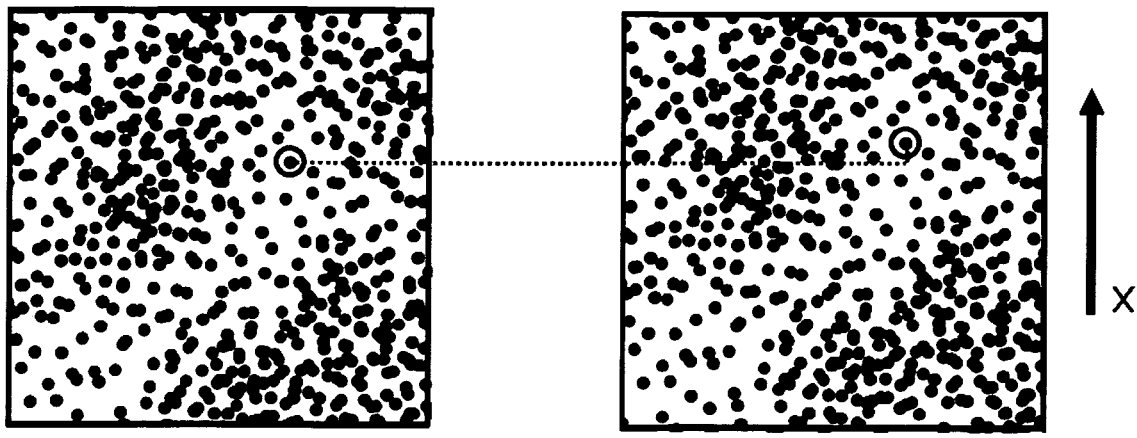
Fig. 1
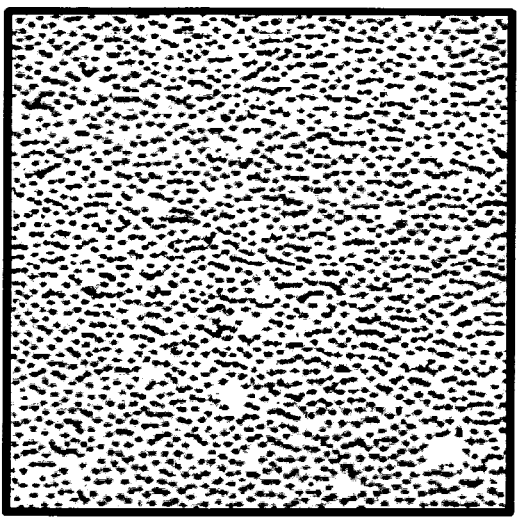 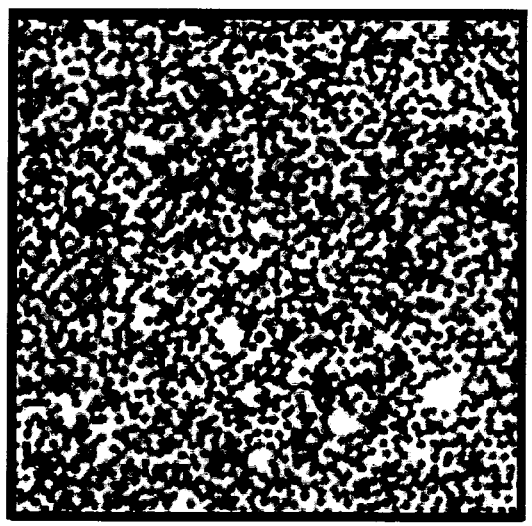
Fig. 2a                                   Fig. 2b

METHOD FOR ALIGNING AT LEAST ONE PART OF ONE DIGITAL IMAGE TO AT LEAST ONE PART OF ANOTHER DIGITAL IMAGE

The present invention relates to a method and a system for aligning at least one part of one digital image to another digital image. The present invention particularly relates to a method and a system for aligning at least one part of one digital image to another digital image in a sequencing apparatus for analyzing biomolecules by detecting fluorescence signals from a sample probe.

Biotechnology, medicine and related technical fields are based on the analysis of molecules. Electronic devices can analyse molecules with high precision and specificity. Especially in the last years, automated electronic devices have been developed for analysing large numbers of samples by routine methods. For example, modern DNA sequencing apparatus are used for routine analysis of large numbers of DNA probes. Protein samples can be analysed by high throughput screening and related methods. Frequently, such electronic devices detect fluorescent signals emitted from the sample probes. This is possible when molecules, such as nucleic acids or proteins, have been labeled with fluorescent compounds such as dyes.

Commercially available sequencing apparatus are capable of sequencing large numbers of samples labeled with fluorescent dyes in parallel. Recently developed methods, referred to as "next-generation sequencing", NGS, have revolutionized sequencing. NGS allows the massively parallel sequencing of clonally amplified or single DNA molecules that are spatially separated in a flow cell or by generation of an oil-water emulsion. NGS allows thousands or even millions to billions of sequencing reactions to be performed simultaneously.

In NGS, sequencing is performed by repeated cycles of polymerase-mediated nucleotide extensions or, in one format, by iterative cycles of oligonucleotide ligation. As a massively parallel process, NGS generates hundreds of megabases to gigabases of nucleotide-sequence output in a single instrument run, depending on the platform. The inexpensive production of large volumes of sequence data is the primary advantage over conventional methods.

NGS platforms and common applications/fields for NGS technologies are e.g. reviewed in Voelkerding et al, Clinical Chemistry 55:4 641-658, 2009 and Metzker, Nature Reviews/Genetics Volume 11, January 2010, pages 31-46.

In NGS, various oligonucleotides of interest are covalently attached to a support. Subsequently, a nucleotide labeled with a fluorescent dye is attached to the growing oligonucleotide chain with DNA polymerase. When the four nucleotides are labeled with different fluorescent dyes, fluorescent signals emitted from a probe can be detected and the type of nucleotide attached to the oligonucleotide can be identified. After detection, the fluorescent dye is cleaved off and the next synthesis cycle is carried out, in which a new labeled nucleotide is attached to the growing chain. By carrying out multiple cycles, the sequence of a growing oligonucleotide chain can be determined in a stepwise manner. The working steps are carried out in an automated sequencing apparatus.

US 2010/0323350 A1 and WO 2009/117119 A1 relate to methods and compositions for determining the identity of nucleic acids in nucleotide sequences using, for example, data obtained from sequencing by synthesis methods.

WO 2008/097455 A1 relates to an imaging system for exciting and measuring fluorescence on or in samples comprising fluorescent materials, e.g. fluorescent labels, dyes or pigments, in particular to detect fluorescent labels on nucleic acid. Moreover, a device is disclosed being configured such that fluorescent labels in a plurality of different DNA templates are simultaneously detected.

WO 2014/020137 A1 relates to a method for enriching target sequences from a sequencing library to provide a target enriched sequencing library, wherein the sequencing library is suitable for massive parallel sequencing and comprises a plurality of double-stranded nucleic acid molecules.

Fluorescent signals emitted from sample probes with labeled molecules are weak, but the signals have to be detected with high precision and specificity. Thus, precise optical equipment, especially cameras and scanning technology, is required for such processes.

In addition, extensive evaluation of the digital images captured by an optical imaging system of the sequencing apparatus is necessary for obtaining a precise and reliable result of the sequencing, e.g. in FASTQ.

It is an object of the invention to provide a method and a system for aligning at least one part of one digital image to another digital image, particularly to provide a method and a system for aligning at least one part of one digital image to another digital image in a sequencing apparatus for analyzing biomolecules by detecting fluorescence signals from a sample probe. The method according to the present invention is computer-implemented. However, it is understood by the skilled person that there are also other ways of implementing the method according to the present invention.

This object is achieved by a method and a system according to the independent claims. Dependent patent claims refer to preferred embodiments.

The digital images for analyzing biomolecules in a sequencing apparatus are captured/obtained in a sequential order. Between the capturing steps, the field of view or the image section can change, e.g. caused by the movement of the flow-cell of the sequencing apparatus, which leads to misaligned digital images.

Consequently, these misalignments prevent a comprehensive comparison and analysis of the digital images. Thus, the goal of the image registration is to remove the misalignments of the digital images.

Beside the general alignment of the images, better known as image registration, the process also has to be capable to compensate lens distortions to support the subsequent processing steps of the sequencing pipeline.

One of the advantages of using a computer-implemented method rather than a static hardware or calibration solution is to ensure a high reliability of the system over a long time-period, e.g. by inherently compensate nascent backlash of the mechanical components. For example, aging of the sequencing apparatus has to be compensated. Moreover, by avoiding the calibration and re-calibration, which would otherwise be necessary, the maintenance costs are reduced in general.

The invention relates to a method for aligning at least one part of a second digital image with at least one part of a first digital image. The method comprises the step of dividing the at least one part of the first digital image into a plurality of tiles $t\_fi=\{t\_fi1, t\_fi2, \ldots, t\_fin\}$ with n being a positive integer. The method further comprises the step of dividing the at least one part of the second digital image into a plurality of tiles $t\_si=\{t\_si1, t\_si2, \ldots, t\_sin\}$, wherein each tile $t\_siv$ with $v\in\{1, 2, \ldots n\}$ of the plurality of tiles $t\_si$ corresponds to one respective tile $t\_fiv$ of the plurality of tiles $t\_fi$. The method further comprises the step of creating a plurality of correlation images fci={fci_1, fci_2, ... fci_n'} by computing the correlation between each tile t_fiv' and the corresponding tile t_siv' with v'∈{1, 2, ... n'≤n}. The method further comprises the step of determining the position of a global maximum correlation value p_v' for each of the plurality of correlation images fci_v'. The method further comprises the step of calculating a plurality of first offset vectors fov={fov_1, fov_2, ..., fov_n"}, the offset vector fov_v" with v"∈{1, 2, ... n"≤n'} representing the offset between the tile t_siv" and the corresponding tile t_fiv" being calculated by considering the center position of the corresponding correlation image fci_v" and the position of the global maximum correlation value p_v" of the respective correlation image fci_v" with v"∈{1, 2, ... n"≤n'}. The method also comprises aligning the at least one part of the second digital image with the at least one part of the first digital image by applying the corresponding first offset vectors fov.

Preferably, the above discussed steps of the method according to the present invention are executed in the order as presented above.

The plurality of tiles t_fi and t_si may fully cover the first and second digital image respectively, wherein step of aligning further comprises transforming the tile t_siv" or the position of at least one object in the tile t_siv" by applying the corresponding first offset vector fov_v".

Alternatively, it is preferred that the plurality of tiles t_fi and t_si are distributed over the first and second digital image respectively to cover only a part of the first and second digital image.

The plurality of tiles t_fi and t_si may be equally sized and distributed on a regular grid having a cell size larger than the size of the tiles.

The method may further comprise after calculating the offset vectors fov, assigning the offset vector fov_v" to a predetermined region of the tile t_siv".

The predetermined region may be the center of the tile t_siv".

The method may further comprise after calculating the offset vectors fov, a regression analysis step to determine the parameters of a predetermined function based on the assigned offset vector fov_v" and wherein the step of aligning may further comprise transforming the second digital image by applying said function.

The predetermined function may for example be a degree three polynomial function.

The plurality of tiles t_fi and t_si are preferably distributed on the first and second digital image, respectively, to not overlap.

In other words, in an alternative aspect of the present invention instead of dividing the whole of the first and second image into a plurality of tiles it is preferred to use sparse tiling covering only a small fraction of the image area (e.g. 10% of the image) and subsequently determining an optimal analytic function which extrapolates the offset vectors calculated for each tile to every point in $R^2$ (R=set of real numbers).

That is, it is preferred to use a non-overlapping set of tiles which are adequately distributed over the image area to enable capturing translation, lens distortion and small angle rotation. For example, an adequate tiling can be constructed by placing equally sized tiles on a regular grid with a cell size exceeding the size of the tiles.

Furthermore, according to the alternative aspect of the present invention, in a first step, the offset vectors are calculated for every tile through computation of a correlation image and subtraction of the subpixel-precise position of the maximal correlation value from the center position. The computation cost is dominated by the calculation of the correlation images, and limitation to a small fraction of the image area is able to reduce the computational cost involved.

In a second step, according to the alternative aspect of the present invention, every offset vector may be assigned to the center position of the corresponding tile. This results in a set of data points S={(x1, y1, dx1, dy1), (x2, y2, dx2, dy2), ..., (xn, yn, dxn, dyn)} where xi and yi are the coordinates of the i-th center position and dxi and dyi are the corresponding offsets in the direction of the coordinate axis. The data points in S are used to identify optimal parameters of an adequate function f which satisfies that f(xi,yi)=(dxi+epsxi, dyi+epsyi) for all i in {1, ..., n} such that all error terms epsxi and epsyi are minimal. For instance, as outlined above, a degree 3 polynomial is adequate in the context of automated fluorescence microscopy imaging.

Polynomials have the additional benefit that they are linear functions in their coefficients, so efficient methods for linear last squares regression can be applied for the identification of optimal parameters.

The desired mapping of the image coordinate space onto the reference space is then given by the function g(x,y)=(x, y)+f(x,y). Given the mapping g, every pixel or object can be aligned with the reference image with arbitrary precision and low computational cost by simply evaluating g at the pixel or the object position.

In addition, according to the alternative aspect of the present invention, a minimal footprint for storing the resulting mapping may be achieved. In case of a degree 3 polynomial, the full mapping, it is sufficient to store 8 parameters which, in IEEE-754 single precision floating point format, amounts to 32 byte of memory.

Preferably, fov_v" is calculated as follows:

fov_v"=(center position of the correlation image fci_v)−(peak position of the $p\_v$ of the correlation image fci_v).

Preferably, method according the present invention comprises the step of transforming the position of at least one object in the tile t_siv" by applying the corresponding first offset vector fov_v" after the step of calculating a plurality of first offset vectors fov. One of the advantages of only transforming the position of the at least one object in the tile t_siv" is that not all pixels of the respective tile t_siv" have to be transformed, which is less time-consuming and less resources-consuming.

If n'<n no correlation images are created for t_fix and t_six with x>n'. Thus, the corresponding tiles with the highest indices are to be ignored and no correlation images are to be created.

If tiles with lower indices are to be ignored it has to be considered that corresponding t_fiy and t_siy for a correlation image fci_x would be given by the function y=C(x), i.e. t_fiC(x), t_siC(x). For every correspondence and every direction a respective function would have to be used:

fci→t_fi, t_si;
fov→t_i, t_si;
fov→fci

That is, the information which tiles are to be ignored would have to be determined before dividing the digital images into the plurality of tiles.

Preferably, n=n'=n" and v'=v'=v". Preferably, there is the same number n of tiles t_si of the at least one part of the second digital image and the number n of tiles t_fi of the at least one part of the first digital image as the number n' of correlation images fci, i.e. n=n'.

Preferably, there is the same number n' of correlation images fci as the number n" of first offset vectors fov, n'=n".

The term "object" relates to a predetermined region within the digital image. The predetermined region may be determined by evaluating the intensity at specific regions of the digital image.

Preferably, the at least one object is a bead preferably being configured to receive DNA and/or RNA.

Preferably, the method according to the present invention further comprises the following steps:
creating a correlation image sci by computing the correlation between the at least one part of the first digital image and the at least one part of the second digital image;
determining the position of a global maximum correlation value p_c of the correlation image sci;
calculating an offset vector sov between the at least one part of the first digital image and the at least one part of the second digital image by considering the center position of the first correlation image sci and the position of the global maximum correlation value p_c of the first correlation image sci.

Preferably, the method according to the present invention further comprises the step of transforming the at least one part of the second digital image by applying the calculated offset vector sov. Preferably, the method according to the present invention further comprises the step of transforming the second digital image by applying the calculated offset vector sov. Preferably, these steps are performed before performing the step of dividing the at least one part of the second digital image into the plurality of tiles t_si. Preferably, transforming comprises an affine transformation, i.e. a translation.

Preferably, the transformation relates to a complete shift of the whole image, in particular an integer pixel shift of the whole image.

The person skilled in the art will appreciate that the present invention is not limited to a specific transformation. The choice of a transformation is in general associated with further considerations to appropriately implement a specific transformation to the present invention. Thus, a complete description of every possible transformation and the specific implementation is believed to be within the common general knowledge of a person skilled in the art and its description is omitted at this point.

Preferably, the transformation is generally defined by mapping every pixel in t_siv" to the reference coordinate system (defined by t_fiv"). That is, a new image t_riv" is generated, wherein "r" stands for registered, in which the intensity of every pixel (x, y) corresponds to the intensity at the corresponding pixel (x, y)+fov_v" in t_siv".

If objects, i.e. predetermined regions (regions of interest) (x, y) are to be transformed in t_siv" the transformation may be executed the same way as described above, i.e. by shifting in the reference coordinate system by applying fov_v". The regions, which do not belong to said predetermined regions are then ignored by the transformation.

It is generally not the case that integer pixels are mapped to integer pixels by said transformation. It should be clear to the skilled person that non-integer pixel positions may be handled using interpolation.

The present invention is generally concerned with small shifts between the first and the second digital image. Thus, possible "artefacts" due to the appearance of holes and overlaps created by the transformation are less significant and may be tolerated. These artefacts are even less significant if only predetermined regions of the image are transformed.

However, assigning the calculated offset vectors of a certain tile to the center of the respective tile and using common interpolation, a continuous, non-overlapping, vector field may be generated. Thus, no artefacts may be present in this case.

In the case where the whole image is covered by tiles a bicubic interpolation between neighbouring tiles may be used to obtain appropriate values for each pixel position.

Preferably, the step of transforming the at least one part of the second digital image is performed only if the offset between the at least one part of the second digital image and the at least one part of the first digital image is exceeding a predetermined limit. Preferably, the limit comprises the length of the offset vector sov. Preferably, the limit comprises at least one of the vector components. Preferably, the step of transforming the at least one part of the second digital image is performed only if at least one of the vector components is larger than a predetermined value, more preferably if at least one of the vector components is larger than 10 pixels and/or 10% of a lateral size of a respective tile t_siv or the tile size of a respective tile t_t_siv. Preferably, the predetermined limit is determined under consideration of the size of the at least one part of the second digital image and the first digital image.

Preferably, each tile t_siv of the plurality of tiles t_si has the same length l_1 in a first direction and the same length l_2 in a second direction being perpendicular to the first direction, wherein preferably l_1=l_2, more preferably wherein l_1=l_2=128 pixels.

Preferably, each tile t_fiv of the plurality of tiles t_fi has the length l_1 in the first direction and the length l_2 in the second direction.

Preferably, the first and/or the second digital image contains at least one object carrying a fluorescent compound and wherein the first digital image and/or the second digital image is obtained by an optical imaging system during emission of electromagnetic radiation by the fluorescent compound.

Preferably, the first digital image and/or the second digital image is obtained by an optical imaging system during reflective illumination, preferably during reflective white-light illumination.

Preferably, the correlation between the tile t_siv' and the corresponding tile t_fiv' is computed by phase-correlation or cross-correlation of the tile t_siv' and the corresponding tile t_fiv'.

Preferably, the correlation between the at least one part of the first digital image and the at least one part of the second digital image is computed by phase-correlation or cross-correlation of the at least one part of the first digital image and the at least one part of the second digital image.

The present invention also refers to a system for aligning at least one part of a second digital image with at least one part of a first digital image.

Preferably, the system is configured to carry out the steps of any of the methods according to any of the preceding claims.

The system according to the present invention comprises a first unit configured to divide the at least one part of the first digital image into a plurality of tiles t_fi={t_fi1, t_fi2, . . . , t_fin} with n being a positive integer.

The system further comprises a second unit configured to divide the at least one part of the second digital image into a plurality of tiles t_si={t_si1, t_si2, . . . , t_sin}, wherein each tile t_siv with v∈{1, 2, ... n} of the plurality of tiles t_si corresponds to one respective tile t_fiv of the plurality of tiles t_fi.

The system further comprises a third unit configured to create a plurality of correlation images fci={fci1, fci_1, ... fci_n'} by computing the correlation between each tile t_fiv' and the corresponding tile t_siv' with v'∈{1, 2, ... n'≤n}.

The system further comprises a fourth unit configured to determine the position of a global maximum correlation value p_v' for each of the plurality of correlation images fci_v'.

The system further comprises a fifth unit configured to calculate a plurality of first offset vectors fov={fov_1, fov_2, ... , fov_n"), the offset vector fov_v" with v"∈{1, 2, ... n"≤n'} representing the offset between the tile t_fiv" and the corresponding tile t_siv" being calculated by considering the center position of the corresponding correlation image fci_v" and the position of the global maximum correlation value p_v" of the respective correlation image fci_v" with v"∈{1, 2, ... n"≤n'}.

Preferably, the system further comprises a transformation unit configured to transform the tile t_siv" by applying the corresponding first offset vector fov_v" after the step of calculating a plurality of first offset vectors fov.

Preferably, the system further comprises a transformation unit configured to transform the position of at least one object in the tile t_siv" by applying the corresponding first offset vector fov_v" after the step of calculating a plurality of first offset vectors fov.

Preferably, the system further comprises a unit configured to create a correlation image sci by computing the correlation between the at least one part of the first digital image and the at least one part of the second digital image.

Preferably, the system further comprises a unit configured to determine the position of a global maximum correlation value of the correlation image sci.

Preferably, the system further comprises a unit configured to calculate an offset vector sov between the at least one part of the first digital image and the at least one part of the second digital image by considering the center position of the first correlation image and the position of the global maximum correlation value of the first correlation image.

Preferably, the system further comprises unit configured to transform the at least one part of the second digital image and/or the second digital image by applying the calculated offset vector sov. Preferably, these steps are performed before performing the step of dividing the at least one part of the second digital image into the plurality of tiles t_si.

The present invention also relates to a computer program product comprising one or more computer readable media having computer executable instructions for performing the steps of any of the aforementioned methods.

The present invention will be explained in more detail in the following with reference to preferred exemplary embodiments and with reference to the attached drawings, in which:

FIG. 1 shows an exemplary sketch of a second digital image representing a white-light image and an exemplary sketch of a first digital image representing a fluorescence image;

FIG. 2a shows an exemplary white-light image;

FIG. 2b shows an exemplary fluorescence image;

The left side of FIG. 1 shows an exemplary sketch of a first digital image representing a so-called white-light image, i.e. a digital image being obtained using an optical imaging system during reflective white-light illumination of a part of the flow cell of the sequencing apparatus. An exemplary white-light image is shown in FIG. 2a. The exemplary white-light image is color-inverted for illustrative purposes.

The right side of FIG. 1 shows an exemplary sketch of a second digital image representing a so-called fluorescence image, i.e. an image being obtained during emission of fluorescent compounds, wherein a fluorescent compound is attached to a bead being configured to receive on the surface at least one molecule comprising DNA or RNA. Such beads are for example commercially available, e.g., from Thermo Fisher Scientific Inc., e.g. under the brand Dynabeads, see reference [1]. And exemplary fluorescence image is shown in FIG. 2b. The exemplary fluorescence image is color-inverted for illustrative purposes.

In FIG. 1, the beads are shown as black dots. However, it is understood by the skilled person that the size of the beads and the number of the beads are chosen for illustrative purposes and do not reflect their actual size and number.

As can be seen by the encircled beads in the exemplary sketch of the first digital image and of the second digital image, there is an offset between the first digital image and the second digital image in the direction denoted as "x" in FIG. 1.

Figure 3:
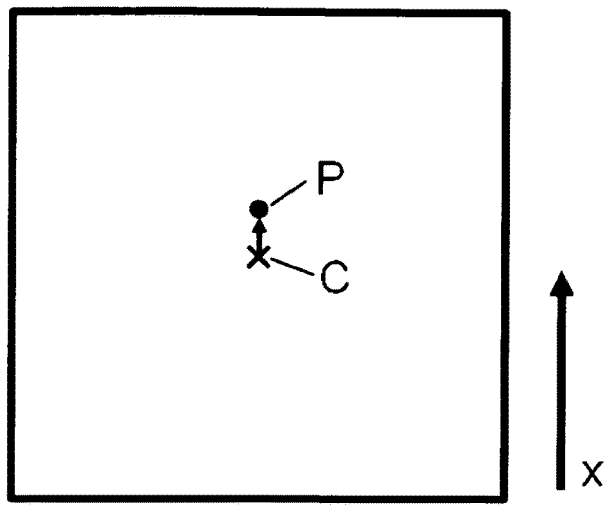
FIG. 3 shows an exemplary sketch of a correlation image between the sketch of the second digital image as shown in FIG. 1 and the sketch of the first digital image as shown in FIG. 1.

FIG. 3 shows an exemplary sketch of a correlation image between the sketch of the first digital image as shown in FIG. 1 and the sketch of the second digital image as shown in FIG. 1. The correlation image is preferably correlated by cross-correlation. As can be seen, there is a peak P in the correlation image, i.e. a global maximum correlation value in the correlation image, displaced from the center C in the "x"-direction. This displacement of the peak P in the correlation image from the center directly results from the offset between the sketch representing the first digital image and the sketch representing the second digital image.

Figure 4:
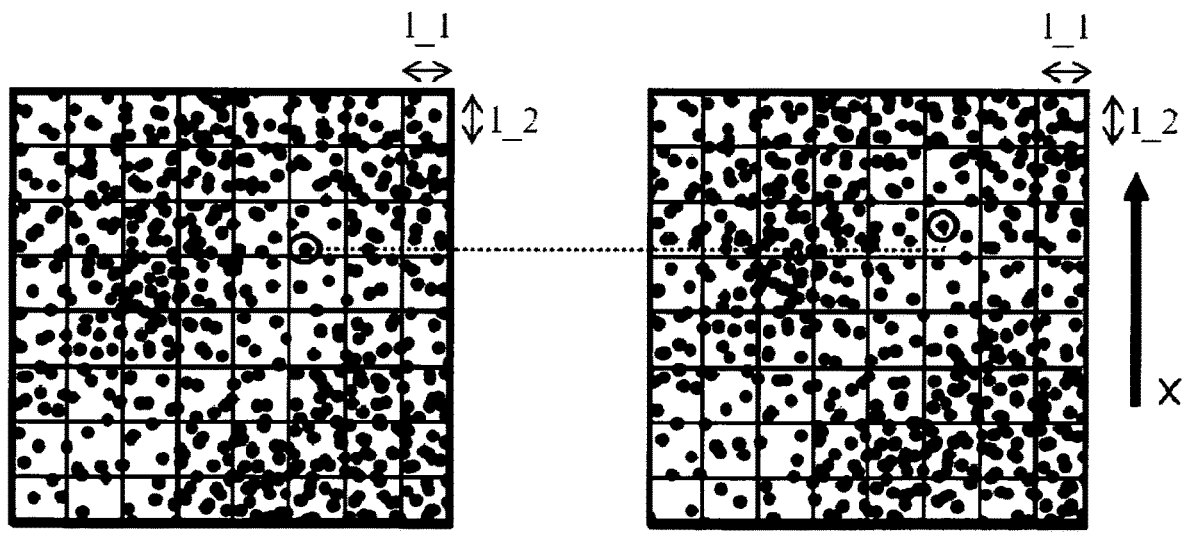
FIG. 4 shows an exemplary division of the sketch of the second digital image as shown in FIG. 1 and the sketch of the first digital image as shown in FIG. 1 into a plurality of tiles according to a preferred embodiment of the present invention.

FIG. 4 shows an exemplary division of the sketch of the second digital image as shown in FIG. 1 and the sketch of the second digital image as shown in FIG. 1 into a plurality of tiles according to a preferred embodiment of the present invention. In the preferred embodiment, the first digital image is divided into 64 tiles t_fi and the second digital image is divided into 64 tiles t_si. Each tile t_fiv of the 64 tiles t_fi of the first digital image and each tile t_siv of the 64 tiles t_si of the second digital image have a length l_1 in a direction perpendicular to the "x"-direction as shown in FIG. 4 and a length l_2 in the "x"-direction, wherein both lengths l_1 and l_2 are the same. In other words, the tiles t_fiv and the tiles t_siv have the same size.

In this embodiment, after the division of both images into tiles, a correlation image fci_v for each tile t_fiv and each tile t_siv is created resulting in 64 correlation images fci. The correlation images fci are computed in this embodiment by cross-correlation.

After the creation of the correlation images, the position of a respective peak, i.e. a respective global maximum correlation value, in each of the plurality of correlation images fci_v is determined.

In a further step, an offset vector fov_v between the tile t_fiv and the corresponding tile t_siv for each of the 64 pairs of tiles is calculated. The calculations are performed considering the center position of the respective correlation image fci_v and the position of the global maximum correlation value p_v of the correlation images fci_v. In other words, for each pair of tiles an offset vector fov_v can be calculated as follows:

fov_v=(center position of the correlation image fci_v)−(peak position of the $p\_v$ of the correlation image fci_v).

One of the advantages of dividing both images into a plurality of tiles is that an appropriate subdivision into tiles intrinsically considers rotational displacement, which can result from lens distortions for example.

In a further step, a bead position is transformed using the respective offset vector fov_v, wherein the bead is located in the tile t_siv. In other words, only the bead position is transformed and not the whole tile t_siv. One of the advantages of only transforming the bead position then rather the whole tile is that not all pixels of the respective tile have to be transformed, and in particular not the whole second digital image, which is less time-consuming and requires less resources. It is understood by the skilled person that not only one bead position can be transformed in the respective tile t_siv but also a plurality of bead positions can be transformed in the respective tile t_siv without having to transform all pixels of the respective tile. Moreover, it is also understood by the skilled person, that at least one bead position can be transformed in every tile t_siv or merely at least one bead position in some of the tiles t_si without having to transform all pixels.

Figure 5:
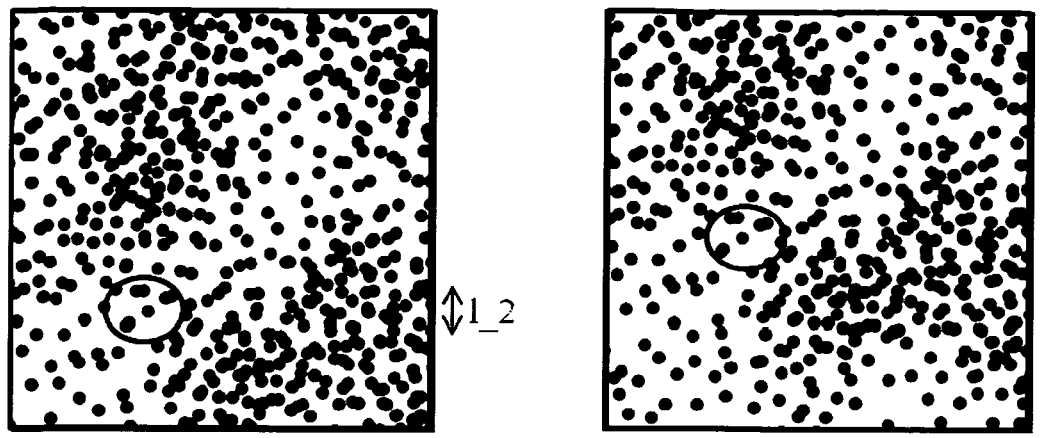
FIG. 5 shows an example sketch where the offset between the first digital image and the second digital image is larger than a predetermined value.

FIG. 5 shows an example, where the offset between the first digital image and the second digital image is larger than a predetermined value, according to this preferred embodiment larger than the block size of the subdivision, i.e. larger than a fraction of the length l_1 and/or l_2 of the tiles t_fiv and t_siv. In this case, the tiles would not overlap and the registration process would fail. Therefore, a global registration is performed before the aforementioned explained method of alignment using the division into tiles. One of the advantages of such a global registration is the improvement of robustness of the alignment method.

As can be seen in the encircled sections of the first digital image and the second digital image, the offset between the first digital image in the second digital image in "x"-direction is larger than the size l_2 of the tiles t_fiv and t_siv if one would directly divide the first digital image and the second digital image into a plurality of tiles t_fi/t_si. As a consequence, there would be no overlap between tile t_fiv and tile t_siv and the registration would fail.

The previous method steps of this preferred embodiment are performed before the division of the first digital image and the second digital image into a plurality of tiles as presented in the preferred embodiment as shown in FIG. 4.

In a first step, a correlation image sci between the first digital image and the second digital image is created by computing the correlation between the first digital image and the second digital image. In this preferred embodiment the correlation image is created by cross-correlation.

In a second step, the position of the global maximum correlation value of the correlation image sci, i.e. the peak value of the correlation image as shown for example in FIG. 3 is determined.

In a third step, an offset vector sov between the first digital image and the second digital image is calculated by considering the center position of the first correlation image and the position of the global maximum correlation value of the first correlation image. In other words, the offset vector sov can be calculated as follows:

sov=(center position of the first correlation image sci)−(peak position of the of the first correlation image).

If it is determined that the offset between the first digital image and the second digital image is exceeding a predetermined limit, the second digital image is transformed by applying the calculated offset vector sov. It is understood by the skilled person that the aforementioned translation is performed by an affine transformation. In this preferred embodiment, the limit comprises at least one of the vector components. In this embodiment, the second digital image is transformed by applying the calculated offset vector sov only if at least one of the vector components is larger than a predetermined value, e.g. 10% of a lateral size of a respective tile t_siv or 10% of a lateral size of a respective tile t_siv. One of the advantages of only transforming the second digital image, if the offset between the first digital image and the second digital image is exceeding a predetermined limit, is that a time-consuming and resource-consuming global transformation has only to be performed if the offset is too high, thus, resulting in failed registration process.

Figure 6:
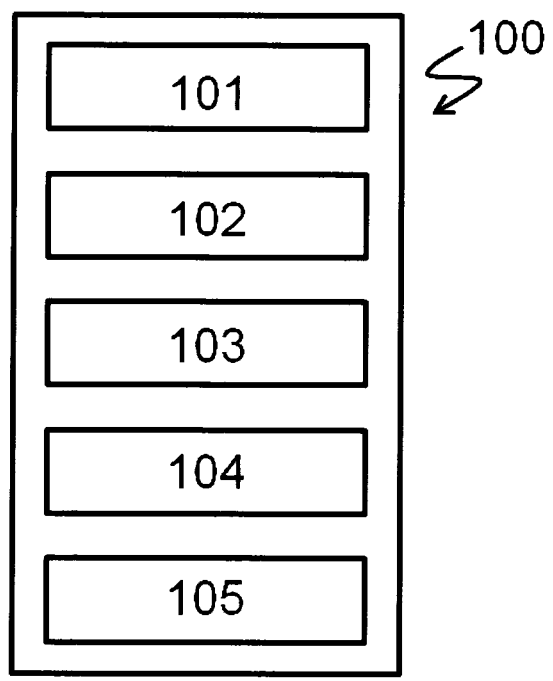
FIG. 6 shows an exemplary system according to a preferred embodiment of the present invention.

FIG. 6 shows an exemplary system 100 according to a preferred embodiment of the present invention.

In general, the system 100 is configured to carry out the method steps as presented in the embodiment with reference to FIG. 4.

The system 100 comprises a first unit 101 which divides the first digital image into a plurality of tiles t_fi. After the first unit 101 has divided the first digital image into a plurality of tiles t_fi, a second unit 102 divides the second digital image into a plurality of tiles t_si. It is understood by the skilled person, that both processes can be performed by the first unit 101 and the second unit 102 simultaneously. As an alternative, is also understood by the skilled person that the second unit 102 can divide the second digital image into a plurality of tiles t_si before the first unit 101 divides the first digital image into a plurality of tiles t_fi. The result of a division performed by the first unit 101 is presented on the left side of FIG. 4. The result of the division performed by the second unit 102 is presented on the right side of FIG. 4.

The system 100 further comprises a third unit 103 which creates a plurality of correlation images fci by computing the correlation between each tile t_siv and the corresponding tile t_fiv.

Moreover, the system 100 further comprises a fourth unit 104 which determines the peak position p_v of the correlation image for each correlation image fci_v, i.e. the position of a global maximum correlation value for each correlation image fci_v.

The system 100 further comprises a fifth unit 105 which calculates for each pair t_fiv and t_siv the offset vector fov_v by considering the center position of the corresponding correlation image fci_v and the peak position p_v. In other words, the fifth unit 105 is configured to calculate fov_v by using the formula as presented in the embodiment with reference to FIG. 4.

Figure 7:
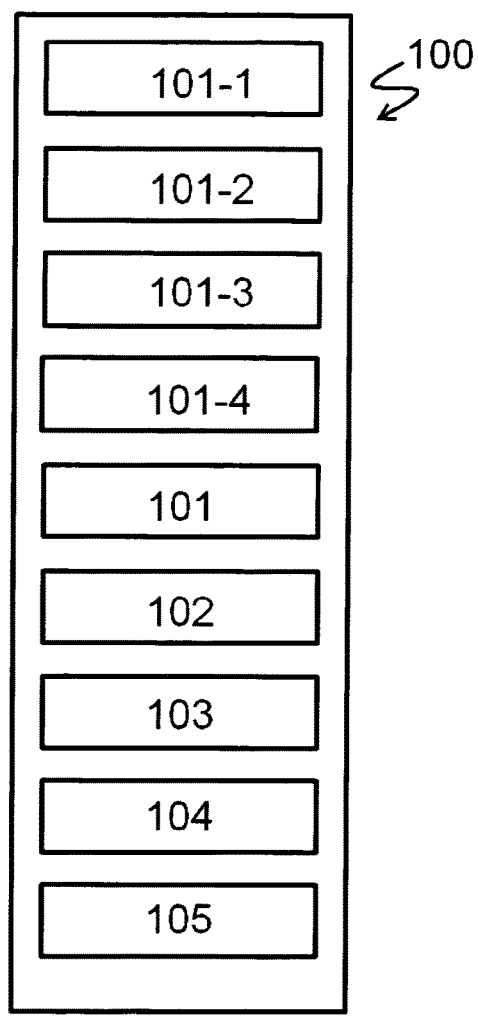
FIG. 7 shows an exemplary system according to another preferred embodiment of the present invention.

FIG. 7 shows an exemplary system 100 according to another preferred embodiment of the present invention.

The system 100 comprises the same units as the system 100 according to the preferred embodiment with reference to FIG. 6. In addition, the system 100 further comprises a unit 101-1 which creates a correlation image sci by computing the correlation between the first digital image and the second digital image. After the unit 101-1 has created the correlation image sci, a unit 101-2 determines the position of a global maximum correlation value of the correlation image sci. After the unit 101-2 has determined the position of the global maximum correlation value, i.e. the peak of the correlation, the unit 101-3 calculates an offset vector sov between the first digital image and the second digital image by considering the center position sci of the first correlation image and the position of the global maximum correlation value of the first correlation image sci. If the offset between the first digital image and the second digital image is exceeding a predetermined limit, the unit 101-4 is transforming the second digital image by applying the offset vector sov to the second digital image. After the transformation or if the transformation is not necessary since the offset between the first digital image and the second digital image is not exceeding the predetermined limit, the first to fifth units 101 to 105 are performing the process steps as discussed in the preferred embodiment with reference to FIG. 6.

While the invention has been illustrated and described in detail in the drawings and foregoing description, such illustration and description are to be considered illustrative or exemplary and non-restrictive; the invention is thus not limited to the disclosed embodiments. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality and may mean "at least one".

REFERENCES

[1]—https://www.thermofisher.com/de/de/home/brands/product-brand/dynal.html

The invention claimed is:

1. A computer implemented method for aligning at least one part of a second digital image with at least one part of a first digital image, the method comprising:
dividing the at least one part of the first digital image into a first plurality of tiles;
dividing the at least one part of the second digital image into a second plurality of tiles, wherein each tile of the second plurality of tiles corresponds to a tile of the first plurality of tiles;
creating a plurality of correlation images by computing a correlation between each tile of the first plurality of tiles and a corresponding tile of the second plurality of tiles;
determining a position of a global maximum correlation value for each of the plurality of correlation images;
calculating a plurality of offset vectors, wherein each offset vector of the plurality of offset vectors represents an offset between a tile of the first plurality of tiles and a corresponding tile of the second plurality of tiles based on a center position of a corresponding correlation image of the plurality of correlation images and the position of the global maximum correlation value of the corresponding correlation image of the plurality of correlation images; and
aligning the at least one part of the second digital image with the at least one part of the first digital image by applying the plurality of offset vectors.

2. The method according to claim 1, wherein the first plurality of tiles and the second plurality of tiles fully cover the first and second digital image respectively, and the aligning further comprises:
transforming a position of at least one object in each tile of the first plurality of tiles by applying a corresponding offset vector of the plurality of offset vectors.

3. The method according to claim 2, wherein the at least one object is a bead configured to receive deoxyribonucleic acid (DNA) or ribonucleic acid (RNA).

4. The method according to claim 1, wherein the first plurality of tiles and the second plurality of tiles are distributed over the first and second digital image respectively to cover a part of the first and second digital image.

5. The method according to claim 4, wherein the first plurality of tiles and the second plurality of tiles are equally sized and distributed on a regular grid having a cell size larger than a size of the tiles of the first plurality of tiles and the second plurality of tiles.

6. The method according to claim 4, further comprising:
assigning each offset vector of the plurality of offset vectors to a predetermined region of a corresponding tile of the first plurality of tiles.

7. The method according to claim 6, wherein the predetermined region is a center of the corresponding tile of the first plurality of tiles.

8. The method according to claim 4, further comprising:
performing a regression analysis step to determine parameters of a predetermined function based on an assigned offset vector of the plurality of first offset vectors, and the aligning further comprises:
transforming the second digital image by applying the predetermined function.

9. The method according to claim 8, wherein the predetermined function is a degree three polynomial function.

10. The method according to claim 2, wherein the first plurality of tiles and the second plurality of tiles are distributed on the first and second digital image, respectively, to not overlap.

11. The method according to claim 1, further comprising:
creating a first correlation image by computing a correlation between the at least one part of the first digital image and the at least one part of the second digital image;
determining the position of the global maximum correlation value for the first correlation image; and
calculating an offset vector between the at least one part of the first digital image and the at least one part of the second digital image by considering a center position of the first correlation image and the position of the global maximum correlation value of the first correlation image.

12. The method according to claim 11, further comprising:
transforming the at least one part of the second digital image by applying the calculated offset vector.

13. The method according to claim 1, wherein each tile of the first plurality of tiles has a same first length in a first direction and a same second length in a second direction that is perpendicular to the first direction, wherein the first length and the second length are 128 pixels.

14. The method according to claim 13, wherein each tile of the second plurality of tiles has the first length in the first direction and the second length in the second direction.

15. The method according to claim 1, wherein the first or the second digital image contains at least one object carrying a fluorescent compound, and wherein the first digital image or the second digital image is obtained by an optical imaging system during emission of electromagnetic radiation by the fluorescent compound.

16. The method according to claim 1, wherein the first digital image or the second digital image is obtained by an optical imaging system during reflective illumination, preferably during reflective white-light illumination.

17. The method according to claim 1, wherein the correlation between the tile of the first plurality of tiles and the corresponding tile of the second plurality of tiles is computed by phase-correlation or cross-correlation of the tile of the first plurality of tiles and the corresponding tile of the second plurality of tiles.

18. The method according to claim 11, wherein the correlation between the at least one part of the first digital image and the at least one part of the second digital image is computed by phase-correlation or cross-correlation of the at least one part of the first digital image and the at least one part of the second digital image.

19. A computer system for aligning at least one part of a second digital image with at least one part of a first digital image, comprising:
   a memory; and
   at least one processor coupled to the memory and configured to:
   divide the at least one part of the first digital image into a first plurality of tiles;
   divide the at least one part of the second digital image into a second plurality of tiles, wherein each tile of the second plurality of tiles corresponds to a tile of the first plurality of tiles;
   create a plurality of correlation images by computing a correlation between each tile of the first plurality of tiles and a corresponding tile of the second plurality of tiles;
   determine a position of a global maximum correlation value for each of the plurality of correlation images; and
   calculate a plurality of offset vectors, wherein an offset vector of the plurality of offset vectors represents an offset between a tile of the first plurality of tiles and a corresponding tile of the second plurality of tiles based on a center position of a corresponding correlation image of the plurality of correlation images and the position of the global maximum correlation value of the corresponding correlation image of the plurality of correlation images; and
   align the at least one part of the second digital image with the at least one part of the first digital image by applying the plurality of offset vectors.

20. A non-transitory computer readable media having instructions stored thereon that, when executed by at least one computing device, cause the at least one computing device to perform operations comprising:
   dividing at least one part of a first digital image into a first plurality of tiles;
   dividing at least one part of a second digital image into a second plurality of tiles, wherein each tile of the second plurality of tiles corresponds to a tile of the first plurality of tiles;
   creating a plurality of correlation images by computing a correlation between each tile of the first plurality of tiles and a corresponding tile of the second plurality of tiles;
   determining a position of a global maximum correlation value for each of the plurality of correlation images;
   calculating a plurality of offset vectors, wherein an offset vector of the plurality of offset vectors represents an offset between a tile of the first plurality of tiles and a corresponding tile of the second plurality of tiles based on a center position of a corresponding correlation image of the plurality of correlation images and the position of the global maximum correlation value of the corresponding correlation image of the plurality of correlation images; and
   aligning the at least one part of the second digital image with the at least one part of the first digital image by applying the plurality of offset vectors.

* * * * *